May 20, 1958 P. B. JANETTI 2,835,050
DRIER FOR GRANULAR MATERIALS
Filed Sept. 2, 1954 6 Sheets-Sheet 1
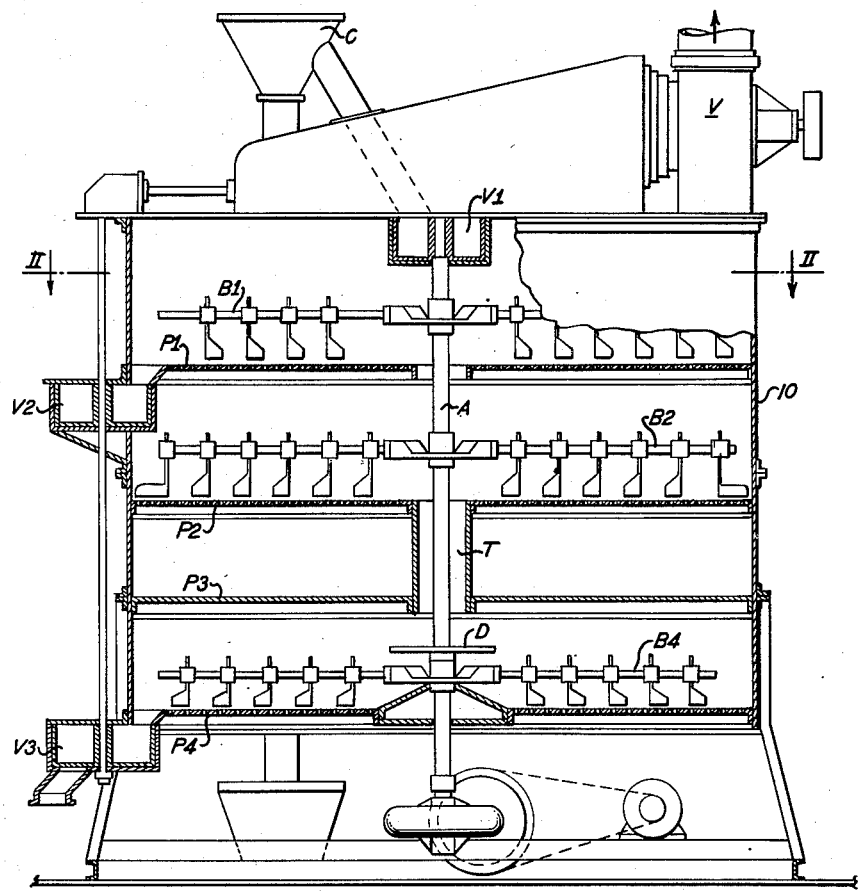
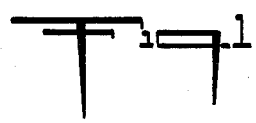
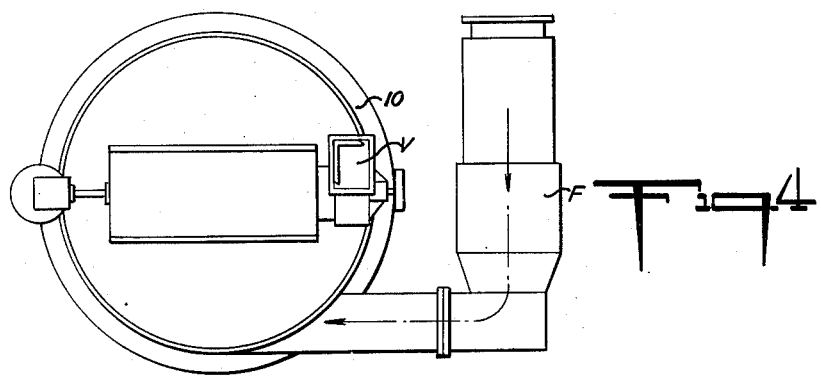

May 20, 1958 P. B. JANETTI 2,835,050
DRIER FOR GRANULAR MATERIALS
Filed Sept. 2, 1954 6 Sheets-Sheet 2
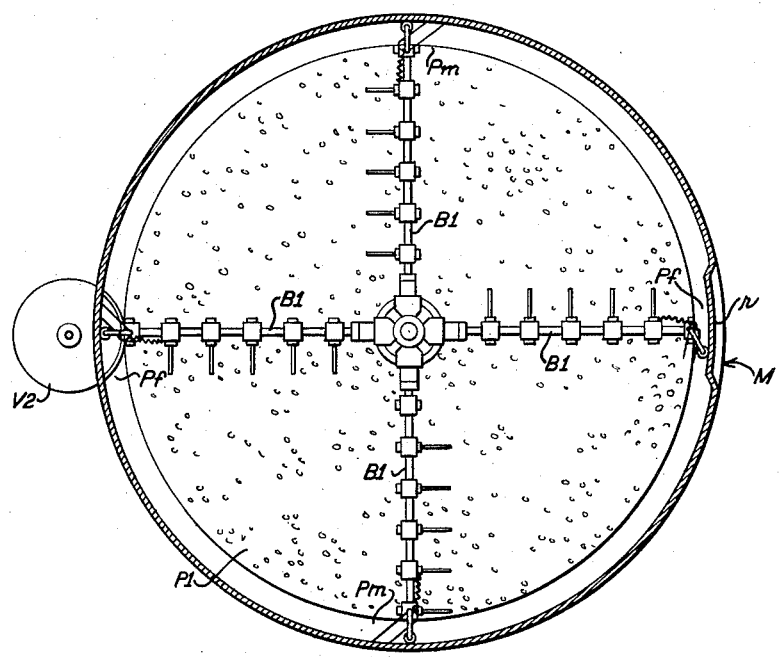
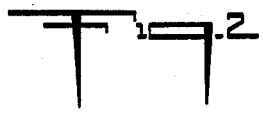
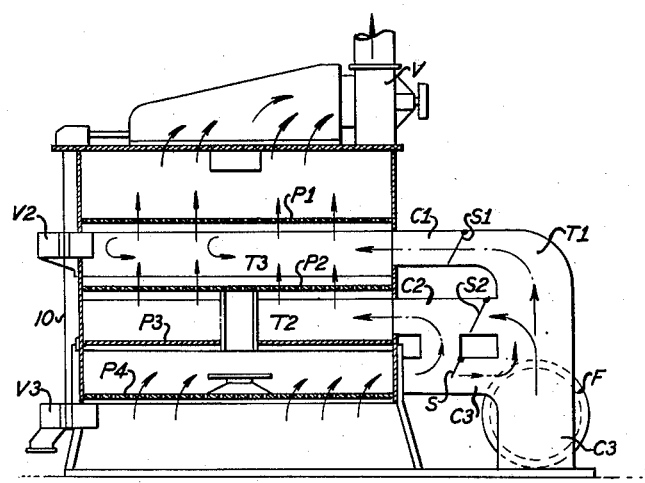
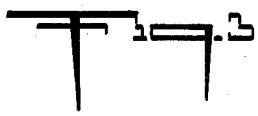

May 20, 1958
P. B. JANETTI
2,835,050
DRIER FOR GRANULAR MATERIALS
Filed Sept. 2, 1954
6 Sheets-Sheet 3
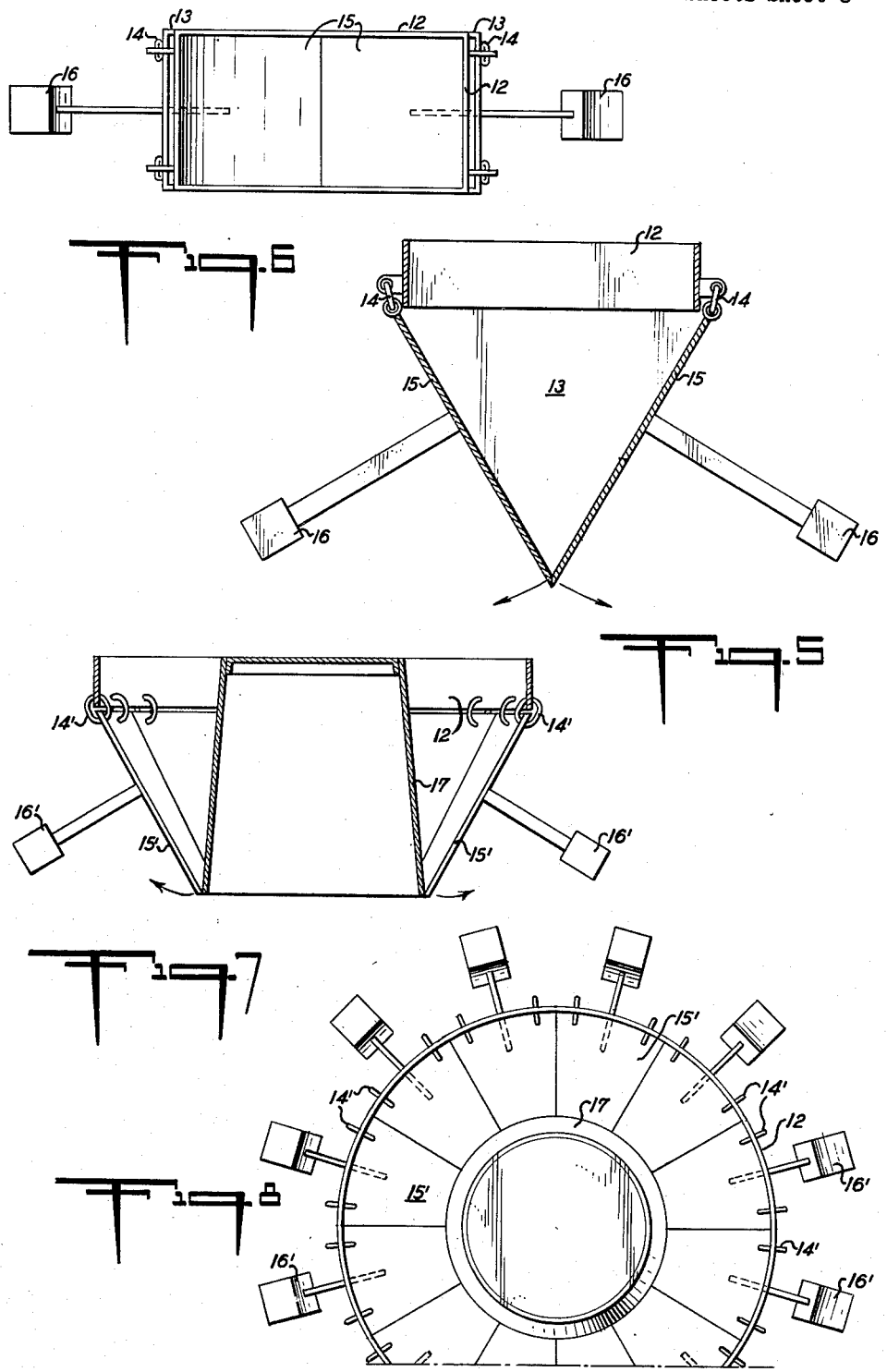

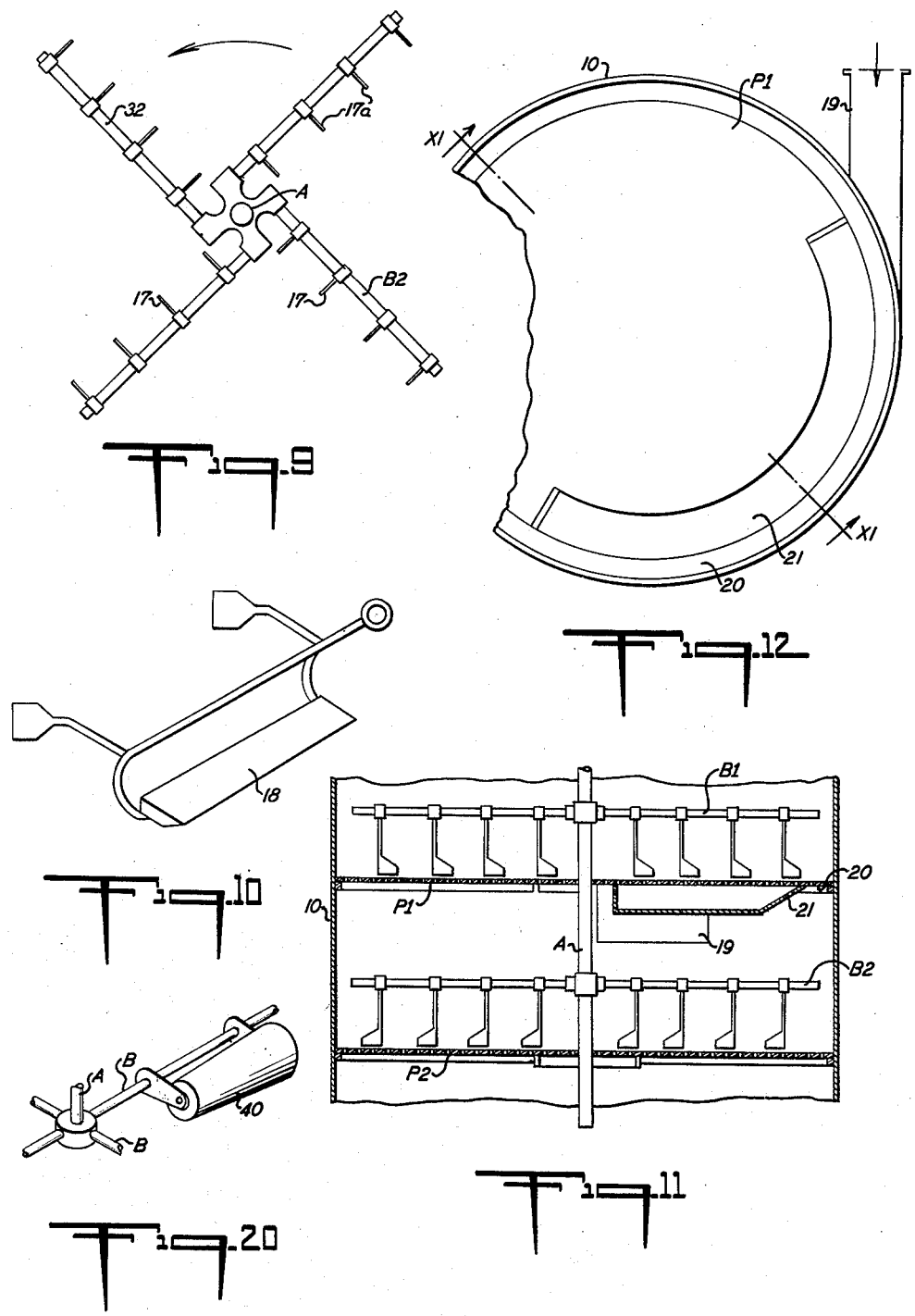

May 20, 1958     P. B. JANETTI     2,835,050
DRIER FOR GRANULAR MATERIALS
Filed Sept. 2, 1954     6 Sheets-Sheet 5
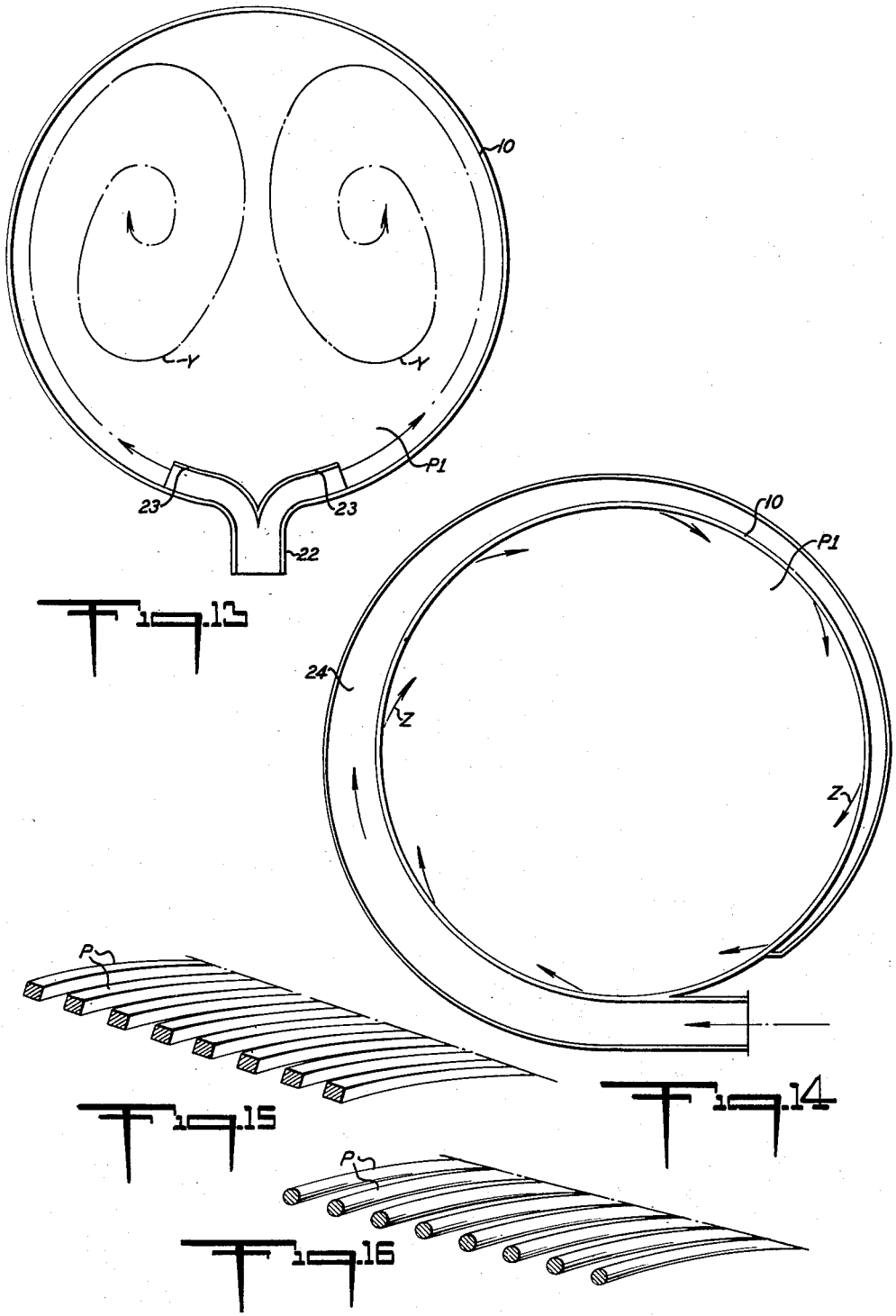

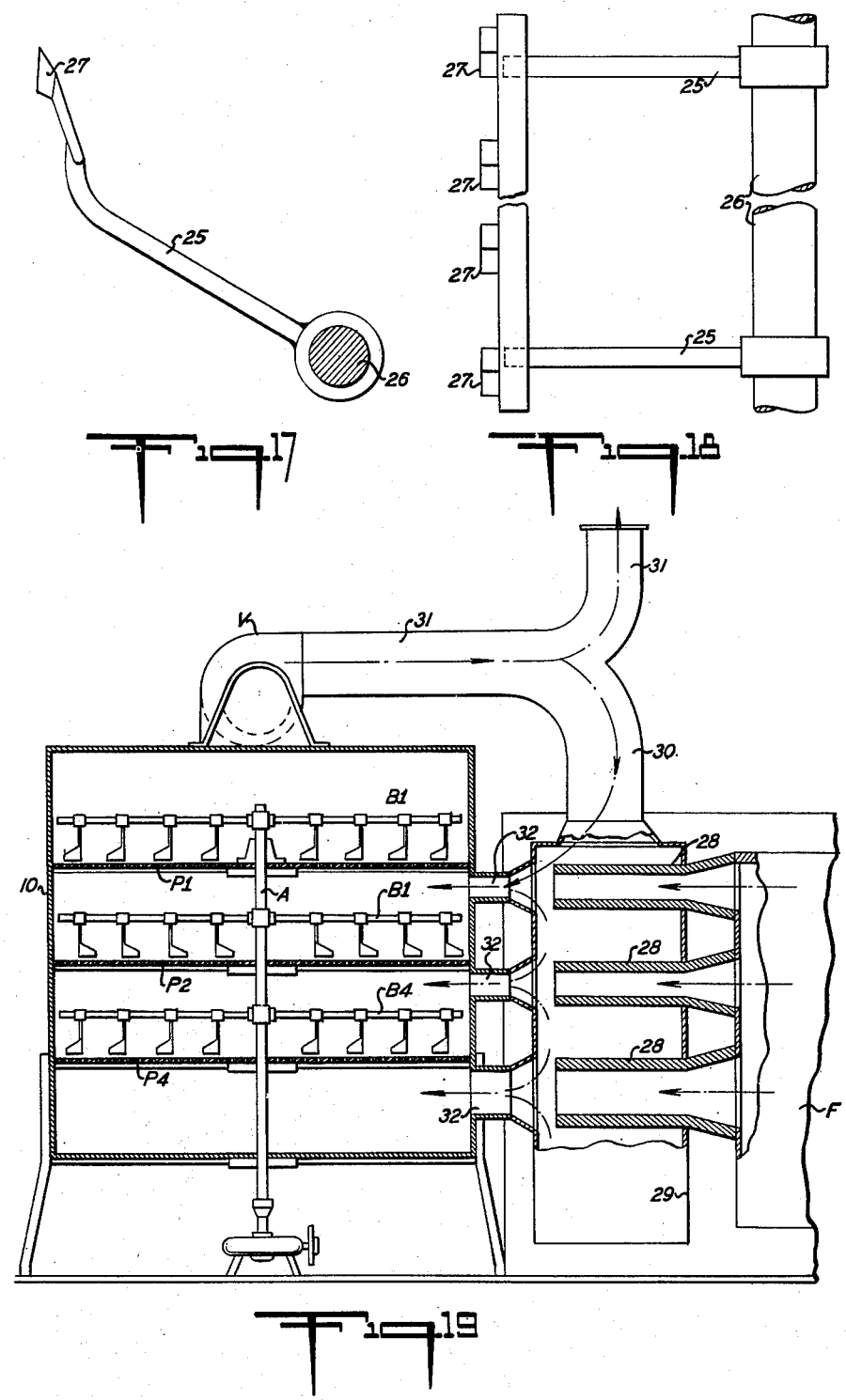

United States Patent Office 2,835,050
Patented May 20, 1958

2,835,050

DRIER FOR GRANULAR MATERIALS

Pierfranco Bianchi Janetti, Milan, Italy

Application September 2, 1954, Serial No. 453,836

Claims priority, application Italy September 3, 1953

8 Claims. (Cl. 34—173)

This invention relates to driers for granular materials.

It is known that wheat, corn and other cereals have particular requirements. It is, therefore, necessary to treat such cereal grains at properly adjusted and easily maintained low temperatures of desired degree and it is also necessary to cool and cleanse the product of dust, chaff and the like. Normally, a drier cannot accomplish all of these operations so that certain of these steps must, therefore, be effected in separate devices.

In order to meet these requirements and still maintain the cost of the drier within economical limits and to insure transportability even for a drier having a considerable productive capacity (which is another important consideration with this kind of drier), the best drying techniques and conditions have to be used.

Accordingly, an object of this invention is to provide an apparatus permitting all of the following conditions:

(1) A continuous movement of the material while continuously traversing it with air because only in this way can drying be effected in the least time at an air temperature only slightly above that which the material can tolerate for an undetermined length of time.

(2) A subdivision of the drying process into at least two stages in which air quantities and temperatures are proportioned to the amount of water that can be eliminated during the respective stages.

(3) Effecting the drying of thin, regular and regulatable layers of the material.

(4) A sufficient air velocity to remove dust, chaff and the like with the drying air.

(5) Cooling of the product in the final stage and recovery of the removed heat for use in the earlier stages.

(6) Mechanical and operational simplicity and ease.

(7) A high thermal efficiency; a possibility for heat insulation of the drier at a low cost, should it have to operate in the open air.

(8) Such weight and dimensions as will not seriously affect the transportability of driers having large productive capacities.

The above desirable characteristics of apparatus embodying the present invention render it also useful for the treatment of numerous other agricultural and industrial products and permit the inclusion of special adaptations according to the nature of the product and its moisture content.

In the drawing:

Fig. 1 is a side, partially sectional view schematically illustrating a drier according to the invention;

Fig. 2 is a sectional view taken along line II—II of Fig. 1;

Fig. 3 is a reduced scale view of the drier of Fig. 1 in which the hot air conduits in the different zones are shown;

Fig. 4 is a reduced scale top plan view of the drier with its conduits and an oven or heat generator;

Figs. 5 and 6 are respectively a vertical section and a plan view of a valve adapted for use in the drier embodying this invention for controlling the passage of the material from one flat to another at the periphery of the flats;

Figs. 7 and 8 are respectively a vertical section and a plan view of a valve adapted for use in the drier embodying this invention for controlling the passage of the material from one flat to another at the center of the flats;

Fig. 9 shows a group of carrying arms according to a particular embodiment of the invention;

Fig. 10 is a perspective view of a scraper paddle;

Fig. 11 is a sectional view of a drier embodying this invention taken along line XI—XI of Fig. 12 and provided with a baffle for directing the entering air;

Fig. 12 is a schematical plan representation of the embodiment of Fig. 11;

Figs. 13 and 14 are schematic plan views of two different schemes for directing air movement inside the drier;

Figs. 15 and 16 are respective views of two constructional arrangements for the material carrying flats;

Figs. 17 and 18 are respectively a side and front elevation of a flat cleaning comb;

Fig. 19 is a vertical sectional view of a drier according to still another embodiment of the invention; and Fig. 20 illustrates a roller employed in accordance with a further embodiment of the invention.

As seen in Figs. 1, 2 and 3 of the drawings, a drier embodying the present invention may comprise a vertical cylindrical body 10 inside of which are mounted horizontal, vertically spaced stationary flats or plates P1, P2, P3 and P4, the flats P1, P2 and P4 being perforated or foramimous so as to be rendered permeable to air, whereas flat P3 is non-perforate. Along the axis of the cylindrical body 10, a rotatable shaft is arranged and carries arms B1, each supporting a plurality of paddles mounted in such a way as to move at a small distance from the upper surface of flat P1. Analogous arms B2 and B4 carrying special paddles are also fastened upon shaft A so as to rotate adjacent to flats P2 and P4 respectively. Upon shaft A between flat P3 and flat P4 a disc D is also mounted, the function of the disc D being hereinafter described in detail.

The material is charged into the apparatus through a hopper C which empties into a rotary valve V1 at the top of the casing or body 10 while a valve V2 controls the passage of the material from above flat P1 to the space above flat P2 and a valve V3 controls the discharge from the drier of the material on flat P4.

A blower or fan V is combined with the body 10 and sucks the air from the interior of the body at the top of the latter thereby putting the whole drier under a partial vacuum.

A furnace F (Fig. 3) is also combined with the cylindrical body 10 and can be fired with combustible oil, coal, wood and be of any type suitable for supplying hot air for the drier and for this purpose conduits C3, C2 and C1 extend from the furnace to the body 10 to introduce hot air into different zones of the drier; this hot air mixing with air coming from the preceding stages of the drier and the proportions of each mixture being controlled by means of dampers S, S1 and S2 in the conduits C3, C1 and C2, respectively.

The material enters the hopper C from above and falls to the middle of the upper flat P1 through the air tight inlet valve V1.

The paddle carrying arms B1, by rotating, displace the material from the middle to the periphery of the flat P1. At the ends of the arms, special paddles (not shown) of known construction, take the material and carry it into the valve V2 from which it passes onto the next lower flat P2.

Arms B2 also rotate with the shaft A and the paddles carried thereby have a special shape causing them to distribute the material along the periphery of the flat.

As seen in Fig. 2, two of the arms B1 preferably have paddles or blades P*f* fixed to the outer ends thereof and engaging the peripheral portion of the underlying flat P1. The other two arms B1 have blades or paddles P*m* swingably mounted on their outer ends and urged by associated springs into engagement with the inner surface of the body 10. The body 10 is provided with an inwardly offset cam portion *r* at the location M so that, as the blades P*m* pass the location M, cam followers associated with the blades or paddles P*m* engage the cam surface *r* in order to swing the associated blades P*m* out of contact with the surface of the body 10. It is to be understood that the cam surface *r* is disposed at a level above that traversed by the blades P*f* which are fixed to the arms B1 so that the cam surface will not interfere with the continuous operation of the last mentioned blades or paddles. This material located over the impermeable peripheral portion of the flat or plate P1 will be moved along by the blades or paddles P*m* until the latter reach the zone M. At this time these blades or paddles are moved radially inwardly by the action of the cam *r*, thus leaving the material in place until it is later picked up and/or moved under the control of the fixed paddles or blades P*f*. The material is then moved by the fixed paddles or blades to the outlet from this level, i. e. the valve means V2 for the flat or plate P1.

Arms B2, by means of their paddles, finally carry the material toward the middle of flat P2 and cause it to fall through a central tube T onto the top of disc D fastened upon the vertical shaft A; scrapers (not shown) depend from the flat P3 and cause the material to fall from disc D onto flat P4.

Arms B4 which are similar to arms B1 carry the material radially outward to discharge valve V3 and during such radially outward travel prior to discharge the material is cooled and cleaned of dust and small filaments.

The aerothermic operation of the described apparatus will be described with reference to Fig. 3 and is as follows:

Cold air enters the body 10 below the flat P4 and passes through the latter to traverse the material, terminate its drying and cool it.

This cooling air, adjusted by the damper S partly enters the back furnace chamber and partly enters conduit C2 where it mixes with heated air or products of combustion from the furnace, the amount of the latter being adjusted by damper S2.

A suitable amount of hot air is thus provided at a temperature of, say, 70° C. and enters the body 10 between the solid flat P3 and the perforated flat P2 so that the hot air traverses the material on flat P2 and leaves by passage through the flat P1, at a lower temperature, say 50° C.

This air at 50° C. is mixed with more air at maximum temperature (100° C., for example) controlled by a thermometer placed at T1 and entering conduit C1 which is adjusted by means of damper S1 so as to obtain, in the interior of the drier, a mixture at a temperature of about 80°.

This air traverses the material on flat P1 and is exhausted by the fan V at a very low temperature (sometimes less than 40° C.).

The construction of this drier guarantees that the material, with respect to the above indicated air temperatures, never will attain temperatures above 50° C., and provides a drying cycle that is very short.

Of course, the temperatures indicated above are only indicative and may be considerably lower.

Preferably, the foraminous flats P1, P2, P4 have peripheral zones impermeable to water, the widths of such zones being about 10 to 12% of the radius of the related flat.

Such impermeable zones increase the efficiency of the drier because they do not permit the air to enter zones that are mainly intended for distributing the material (Fig. 2).

The aerothermic system is the key to the efficiency of the present drier. In fact, due to this system, it is possible to supply, to the relatively damp material on the flat P1, air in a greater amount with higher humidity and temperature and, to the relatively dry material on the flat P4, air in lesser amount with lower humidity and temperature.

The process is something like a counter-current drying process wherein the temperatures and quantity of air gradually diminish at successive drying stages, whereas in conventional counter-current processes the temperature is increased and the air quantity is kept constant throughout the drying process.

Hence, all of the material to be dried, maintained in a uniform layer and continuously stirred up is traversed by currents of air graduated as to amount and temperature for a flat so as to keep the air at all times at the maximum temperature commensurate with the moisture content of the product and the exposure time in the different humidity stages traversed during the drying period.

Lastly, the recovery of the heat removed from the dried product in the last stage, that is, during the presence of the material on flat P4, is realized.

The applicability of this type of drier to grains and other granular and pulverulent materials is obvious, and it is equally obvious that the number of flats required will depend upon the initial moisture content of the material (for moisture content of the order of 60% of the damp weight, three drying flats will generally be sufficient) and the final moisture content to be obtained.

In the particular embodiment of Figs. 5 and 6, the valves controlling the passage of material from one flat to the next lower flat at a location adjacent the periphery of said flats, for example, from the flat P1 to the flat P2 in Fig. 1, are constituted by special hoppers formed by an upper fixed frame 12 carrying fixed sides 13 and the oscillation pins 14 of the two movable walls 15. The latter are held in the closed position illustrated by two counterweights 16. When the material in the hopper has reached a sufficient weight, it causes the oscillation of the two walls 15 in the direction of arrows X so that the material discharges downwards.

This device prevents the material from choking the discharge by forming a bridge. A corresponding valve is shown in Figs. 7 and 8 and relates to a valve controlling discharge in the middle part of the flats; for example, to the discharge of material from the hopper C onto the flat P1.

A plurality of movable walls are articulated at 14′ to a rigid circularly or polygonally shaped frame 12. The walls 15′ cooperate when inclined inwardly so that their adjacent side edges engage to form a closure with the lower border of a substantially cylindrical element 17 (closed above so as not to permit the discharge of the material through said element).

Counterweights 16′ keep the walls 15′ normally in a closed position.

Paddles 17*a* intended to move the material toward the center may be perpendicularly applied to support arms B2 (Fig. 9) which are parallel to the radial directions, but horizontally displaced from said directions toward the direction of movement by distances equal to the horizontal extension of the paddles. The paddles are therefore parallel to each other and can either be fixed on the related arms B2 or free to oscillate relative to the latter and have counterbalancing weights or springs (not shown) associated therewith.

To the rotating arms, other devices can be applied, such as scraper paddles like the one identified by the reference numeral 18 in Fig. 10, resting on the underlying flat with their lower edges so as to turn the material up or to prevent the latter from standing upon the flat a sufficient time to damage the material or to create (as in the instance of driers for xyloid lignite) a source of fire. The rotating arms can also carry one or more rollers 40 (Fig. 20) of a suitable diameter or weight intended to flatten out the material and disintegrate lumps and the like. The combination of scraping paddles and rollers is especially convenient in the case of a material of somewhat pasty consistency (for example, olive grounds with 50% moisture content obtained from centrifugal extractors).

As concerns the direction of the introduction into the body 10 of the hot air coming from the heating furnace, several constructional solutions may be adopted. A first arrangement is illustrated in Figs. 11 and 12 wherein the hot air is tangentially directed through conduit 19 and is then conducted through about a half a turn within the body 10 by a channel formed in the lower blind or solid peripheral portion 20 of the overlying flat P, and by a deflecting baffle formed by a frusto-conical sector 21 turned downwards and toward the axis of cylindrical body 10. In this manner, the mixing between high temperature air coming from conduit 19 and the lower temperature air already present in the body is assisted before the high temperature air may find an outlet through the overlying flat P.

According to another constructional solution, the high temperature air coming from conduit 22 (Fig. 13) is subdivided by two tangential and diametrically opposite conduits 23 and the resulting divided flows of hot air follow the trajectories indicated by the arrows Y.

This solution is particularly suitable for delicate materials. For very delicate materials, the solution shown in Fig. 14 is preferable. In this embodiment the high temperature air travels a spirally formed distributing conduit 24 having suitable openings in its inner wall through which air enters body 10 tangentially to flats P1, P2 and P4 which, in addition to ordinary wire cloth, may be in the form of grates defined by annular concentric bars, of either square or circular cross-section as shown by Figs. 15 and 16 respectively.

The grates may also have sectors with a coarser mesh in order to assist the direct passage to the underlying flat of the finer material. The illustrated grates also permit the use of rotary combs (Figs. 17 and 18) each formed by a frame 25 carried by a radial arm 26 and provided with points 27 sliding between the bars of the grate.

The rotary combs are especially suitable for rather coarse materials which should not be broken into minute pieces and which contain a pasty portion tending to clog the surface of the grate.

Fig. 19 illustrates a special device for the circulation of the air and comprising three conduits 28 for conducting hot air from furnace F; each conduit 28 relating to one of the flats P1, P2 and P4 into a chamber 29 into which also opens a conduit 30 leading from the exhaust conduit 31 of the fan V discharging the damp air from the top of the apparatus. With this arrangement the hot air from conduits 28 exerts an injective effect upon the air from conduit 30 and directs a mixture of hot air and moist cool air toward the apertures 32 opening into body 10. A partial recirculation of the damp air coming out of the apparatus is therefore realized.

Although several illustrative embodiments have been described in detail herein and shown in the accompanying drawings, it is to be understood that the invention is not limited to these precise embodiments, and that various changes and modifications may be effected in the latter without departing from the scope or spirit of the invention as defined in the appended claims.

I claim:

1. A drier for granular materials comprising a casing having therein a plurality of generally horizontal, vertically spaced apart plates each provided with a number of air passages distributed over a major portion of the area of the plates so that the plates are permeable to air, means for introducing granular material to be dried into the top of said casing, means operative to convey the granular material successively from the uppermost plate to the lowermost plate and to discharge dried material from the latter, means including rotary, paddle-carrying arms associated with said permeable plates and operative to mix the granular material on the latter and to convey the granular material transversely across the related permeable plate, suction means connected to the top of said casing to produce an upward air flow through the latter, said suction means constituting the sole means for exhausting air from said drier, a source of hot air, a source of cold air opening into said casing below the lowermost permeable plate so that cool air passes through the granular material on the latter to cool the granular material before its discharge from the casing, conduit means connecting said hot air source to said casing below each of the permeable plates above said lowermost plate, and means operative to mix controlled amounts of relatively cool air with the hot air passing through said conduit means so that the amount, temperature and humidity of air supplied to said casing at levels below each of said permeable plates at successively increasing elevations are progressively increased to provide efficient drying conditions for the introduced granular material wherein each of said plates has a solid peripheral portion that is impermeable to the air passing upwardly through said casing; and wherein said paddle carrying arms have paddles at the free ends thereof that are fixed and movable, respectively, relative to said arms, said movable paddles being shaped to retain the granular material on the solid peripheral portion of the related plate during the operation thereof, and means at a predetermined location in said casing for moving said movable paddles to inoperative positions as the latter pass said location so that the movable paddles then release the material for engagement by said paddles which are fixed with respect to said arms, said fixed paddles being formed to convey the material engaged thereby toward the center of the related plate.

2. A drier according to claim 1; further comprising at least one roller carried by said paddle carrying arms and acting upon the granular material on the underlying plate to flatten such granular material and to break-up any lumps forming in the latter.

3. A drier according to claim 1; wherein at least one of said permeable plates above the lowermost plate has a solid, impermeable peripheral portion; and said conduit means connecting said source of hot air to the casing includes a conduit opening tangentially into said casing below said one plate, a channel on the underside of said solid peripheral portion of the plate extending along a substantial part of the periphery of the latter to conduct hot air from said tangential conduit, said channel opening radially inward, and a baffle in the form of a frusto-conical sector depending from said one plate along the radially inner side of said channel and inclined downwardly towards the center of the casing so that the hot air from said channel is directed downwardly away from the overlying plate to mix with cooler air before passing upwardly through said overlying plate and the granular material on the latter.

4. A drier according to claim 1; wherein said conduit means connecting the hot air source to the casing includes conduit portions opening into said casing in opposed tangential directions below at least one of said permeable plates above said lowermost plate so that the admitted hot air follows opposed, swirling flow patterns for substantially uniform distribution across the overlying plate.

5. A drier according to claim 1; wherein said conduit means connecting the hot air source to the casing includes a spiral conduit arranged below at least one of said permeable plates above the lowermost plate, said spiral conduit having tangential, equally spaced openings in the inner side thereof connecting the interior of said spiral conduit with the interior of said casing and through which the hot air enters said casing and is equally distributed across the overlying plate.

6. A drier according to claim 1; wherein each of said permeable plates includes concentric, annular, spaced apart bars defining a grate-like structure.

7. A drier according to claim 1; wherein each of said permeable plates includes concentric, annular, spaced apart bars defining a grate-like structure; and further comprising combs depending from said paddle-carrying arms and having teeth engaging between said annular bars of the grate-like structure of the underlying plates to prevent clogging of the latter by pasty constituents of the granular material thereon.

8. A drier according to claim 1; wherein said means operative to mix controlled amounts of relatively cool air with the hot air passing through said conduit means includes duct means connected to the discharge of said suction means to receive a part of the relatively cool and moist air withdrawn from the top of said casing, and means for recirculating said part of the relatively cool and moist air, along with added hot air, through said casing; and wherein said recirculating means includes a chamber at the exterior of said casing and having pipes extending therefrom into said casing at levels immediately below the permeable plates in the latter, and injection nozzles axially aligned in said chamber with said pipes and connected to said conduit means conveying the hot air, said duct means connected to the discharge of the suction means opening into said chamber, so that the hot air flowing through said nozzles exerts an injective action upon the relatively cool and moist air supplied to the chamber to cause mixtures of the hot air and the relatively cool and moist air to be propelled through said pipes into said casing.

References Cited in the file of this patent

UNITED STATES PATENTS

| | | |
|---|---|---|
| 97,650 | Kenaga | Dec. 7, 1869 |
| 219,918 | Cormack | Sept. 23, 1879 |
| 230,128 | Gubbins | July 20, 1880 |
| 714,487 | Huillard | Nov. 25, 1902 |
| 742,021 | Graves | Oct. 20, 1903 |
| 919,529 | Black | Apr. 27, 1909 |
| 1,136,933 | Cameron | Apr. 27, 1915 |
| 1,666,617 | Caldwell | Apr. 17, 1928 |
| 1,804,602 | Erf | May 12, 1931 |
| 1,924,255 | Prat | Aug. 29, 1933 |
| 2,099,634 | Thorp et al. | Nov. 16, 1937 |
| 2,178,818 | Earp-Thomas | Nov. 7, 1939 |
| 2,283,641 | Martin et al. | May 19, 1942 |

FOREIGN PATENTS

| | | |
|---|---|---|
| 533,303 | France | Dec. 8, 1921 |
| 487,256 | Great Britain | June 17, 1938 |
| 1,039,993 | France | May 20, 1953 |